(12) United States Patent
Reiter

(10) Patent No.: US 12,233,961 B2
(45) Date of Patent: Feb. 25, 2025

(54) STEERING COLUMN FOR A MOTOR VEHICLE

(71) Applicants: thyssenkrupp Presta AG, Eschen (LI); thyssenkrupp AG, Essen (DE)

(72) Inventor: Gerald Reiter, Elsbethen (AT)

(73) Assignees: thyssenkrupp Presta AG, Eschen (LI); thyssenkrupp AG, Essen (DE)

( * ) Notice: Subject to any disclaimer, the term of this patent is extended or adjusted under 35 U.S.C. 154(b) by 328 days.

(21) Appl. No.: 17/625,595

(22) PCT Filed: Jul. 7, 2020

(86) PCT No.: PCT/EP2020/069046
§ 371 (c)(1),
(2) Date: Jan. 7, 2022

(87) PCT Pub. No.: WO2021/005022
PCT Pub. Date: Jan. 14, 2021

(65) Prior Publication Data
US 2022/0281510 A1  Sep. 8, 2022

(30) Foreign Application Priority Data
Jul. 9, 2019  (DE) ............ 10 2019 210 096.1

(51) Int. Cl.
*B62D 5/00* (2006.01)
*B62D 1/16* (2006.01)
(52) U.S. Cl.
CPC ............ *B62D 5/001* (2013.01); *B62D 1/16* (2013.01)
(58) Field of Classification Search
CPC ................... B62D 5/001; B62D 1/16
(Continued)

(56) References Cited

U.S. PATENT DOCUMENTS

| 5,749,786 | A  | * | 5/1998 | Pattok  | B62D 1/16 464/106 |
| 6,208,923 | B1 | * | 3/2001 | Hommel  | B62D 5/003 701/41 |
| 6,729,432 | B1 | * | 5/2004 | Yao     | B62D 5/0484 180/405 |

(Continued)

FOREIGN PATENT DOCUMENTS

| CA | 2191785 A1 | 5/1997 |
| CN | 106945716 A | 7/2017 |

(Continued)

OTHER PUBLICATIONS

English Translation of International Search Report Issued in PCT/EP2020/069046 dated Oct. 2, 2020.

*Primary Examiner* — Yazan A Soofi
*Assistant Examiner* — Ahmed Alkirsh
(74) *Attorney, Agent, or Firm* — thyssenkrupp North America, LLC

(57) ABSTRACT

A steering column may include a steering shaft that is mounted so as to be rotatable about its longitudinal axis relative to a steering column housing and a revolution limiter to limit rotation of the steering shaft. The revolution limiter has a winding core that is connected fixedly to the steering shaft for conjoint rotation therewith. A strap element may be attached to both the winding core and the steering column housing. The strap element may be elongate, may be deformable flexibly transversely with respect to its longitudinal extent, and may have a strap section that can be wound on the winding core in a winding direction around the longitudinal axis. To decrease complexity and to facilitate compactness, the winding direction of the strap section is reversible.

19 Claims, 3 Drawing Sheets

(58) Field of Classification Search
USPC ........................................................ 701/41
See application file for complete search history.

(56) References Cited

U.S. PATENT DOCUMENTS

| | | | | |
|---|---|---|---|---|
| 10,589,775 | B2 * | 3/2020 | Polmans | ................ B62D 5/005 |
| 2003/0184072 | A1 | 10/2003 | Andonian et al. | |
| 2004/0167693 | A1 * | 8/2004 | Yao | ........................ B62D 5/001 |
| | | | | 180/443 |
| 2007/0216403 | A1 | 9/2007 | Asano | |
| 2016/0009312 | A1 | 1/2016 | Pfeiffer | |
| 2017/0158222 | A1 | 6/2017 | Schulz et al. | |
| 2017/0225704 | A1 * | 8/2017 | Urushibata | ............ B62D 5/005 |
| 2019/0118855 | A1 * | 4/2019 | Yu | ........................... G05B 15/02 |
| 2021/0129898 | A1 | 5/2021 | Forte et al. | |
| 2021/0155281 | A1 * | 5/2021 | Lehmkuhl | ................ B62D 5/04 |

FOREIGN PATENT DOCUMENTS

| | | | |
|---|---|---|---|
| DE | 19544580 C1 | 5/1997 | |
| DE | 100 51 187 A1 | 1/2002 | |
| DE | 103 12 516 A1 | 10/2003 | |
| DE | 102012024946 A1 * | 6/2013 | ........... B60R 25/021 |
| DE | 10 2013 004 055 A1 | 9/2014 | |
| DE | 10 2013 014 137 B3 | 10/2014 | |
| DE | 10 2015 015148 A1 | 6/2017 | |
| DE | 102017209664 A1 * | 12/2018 | ............... B62D 1/16 |
| EP | 3100933 A1 | 12/2016 | |
| JP | 2006153060 A | 6/2006 | |
| JP | 2014210524 A | 11/2014 | |
| JP | 2018118564 A * | 8/2018 | |
| WO | WO-2018139044 A1 * | 8/2018 | |
| WO | 2018189222 A1 | 10/2018 | |

* cited by examiner

STEERING COLUMN FOR A MOTOR VEHICLE

CROSS REFERENCE TO RELATED APPLICATIONS

This application is a U.S. National Stage Entry of International Patent Application Serial Number PCT/EP2020/069046, filed Jul. 7, 2020, which claims priority to German Patent Application No. DE 10 2019 210 096.1, filed Jul. 9, 2019, the entire contents of both of which are incorporated herein by reference.

FIELD

The present disclosure generally relates to steering columns, including steering columns for motor vehicles.

BACKGROUND

Steering columns of this type with a revolution limiter are preferably suitable for steer-by-wire steering systems.

The steering shaft is mounted rotatably in the supporting unit which can be connected fixedly to the vehicle body, or is supported rotatably by the supporting unit. In order to steer the motor vehicle, a steering command is input by the driver by way of rotation of the steering wheel which is attached at the driver-side, rear end of the steering shaft, which steering command is converted into a steering angle of the steerable wheels of the motor vehicle. Whereas, in the case of a conventional steering system, the steering shaft is connected mechanically to the wheels via a steering mechanism, the rotation of the steering shaft is detected by means of sensors in a steer-by-wire steering system and is converted into an electric control signal for actuating electric steering actuators. As a result of the mechanical coupling to the wheels which is absent here, the rotation of the steering shaft is not limited by way of the mechanical end stop of the wheels when the maximum steering angle is reached. In order nevertheless to avoid excessive steering and also to simulate a realistic steering feeling, it is known for the maximum possible rotary angle of the steering wheel to be limited by means of a revolution limiter which forms a limiting device for limiting the maximum possible rotation of the steering shaft.

A steering column with a revolution limiter of the type mentioned at the outset is known, for example, from DE 10 2017 209 664 A1 or DE 100 51 187 A1. Said revolution limiter has a flexible elongate strap element which is wound as a spiral spring in a spiral manner on a winding core which is connected fixedly to the steering shaft for conjoint rotation, to which winding core the one end (namely, the inner end) of the strap element is fastened. The other, outer end of the strap element is connected fixedly to the steering column housing which is a stationary part of the steering column relative to the steering shaft. By way of actuation of the steering wheel in one rotational direction which corresponds to the winding direction of the spiral spring, the steering shaft can be rotated until the spiral spring goes solid, a strap section of the strap element being wound tightly on the winding core. By virtue of the fact that the strap element is then subjected to a tensile load between the winding core and the steering column housing, the maximum steering angle is limited and a further rotation in said rotational direction is not possible.

By virtue of the fact that the spiral spring has a predefined winding direction, it can be used only to limit the steering angle in one rotational direction for functional reasons. Since it is absolutely necessary, however, for the steering angle to be limited in the two possible rotational directions, two spiral springs which are wound in opposite directions have to be used per steering column in the prior art. This leads to a correspondingly high manufacturing and assembly complexity, and requires a relatively large amount of installation space and excessively high costs.

Thus a need exists to decrease the complexity for the revolution limiter, and to make a small overall design possible.

DETAILED DESCRIPTION

Figure 1:
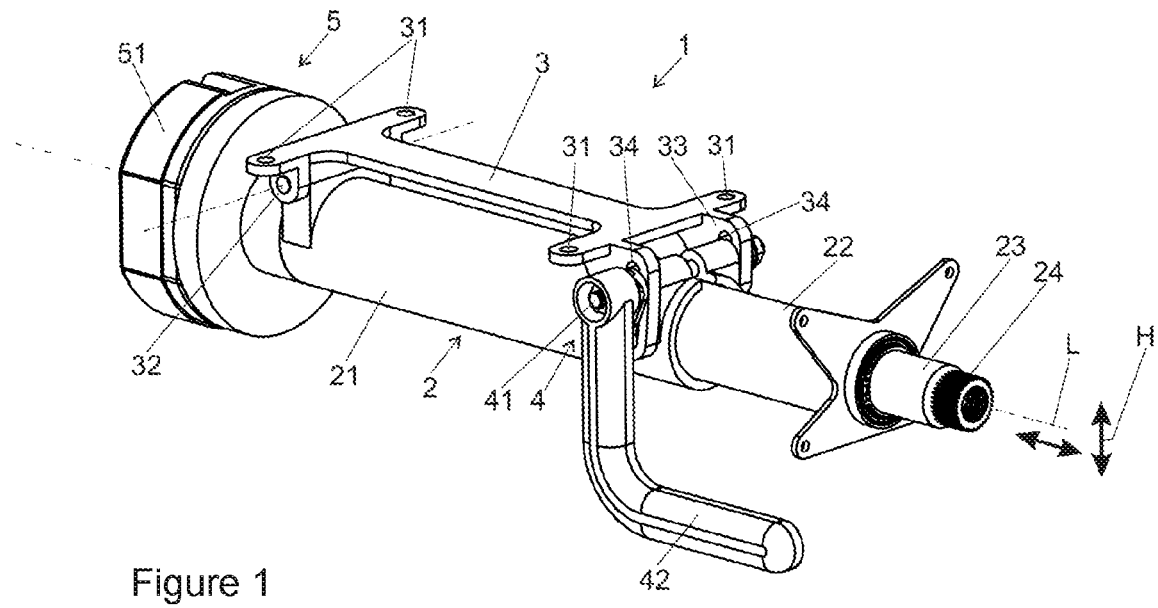
FIG. 1 is a diagrammatic perspective view of an example steering column.

Although certain example methods and apparatuses have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting "a" element or "an" element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art The present disclosure generally relates to a steering column for a motor vehicle. In some examples, such a steering column may comprise a steering shaft which is mounted such that it can be rotated about its longitudinal axis relative to a steering column housing, and has a revolution limiter in order to limit the rotation of the steering shaft, which revolution limiter has a winding core which is connected fixedly to the steering shaft for conjoint rotation and to which a strap element is attached which is connected to the steering column housing, is elongate, can be deformed flexibly transversely with respect to its longitudinal extent, and has at least one strap section which can be wound on the winding core in a winding direction around the longitudinal axis.

In the case of a steering column for a motor vehicle, which steering column comprises a steering shaft which is mounted such that it can be rotated about its longitudinal axis relative to a steering column housing, and has a revolution limiter in order to limit the rotation of the steering shaft, which revolution limiter has a winding core which is connected fixedly to the steering shaft for conjoint rotation and to which a strap element is attached which is connected to the steering column housing, is elongate, can be deformed flexibly transversely with respect to its longitudinal extent, and has at least one strap section which can be wound on the winding core in a winding direction around the longitudinal axis, it is provided according to the invention that the winding direction of the strap section can be reversed.

According to the invention, the winding direction can be changed between the two winding directions which are possible in principle. As a result, it is possible that the same strap section can be spooled or wound selectively in the right-hand or left-hand winding direction in the same axial winding region of the winding core.

By virtue of the fact that, according to the invention, a strap section can alternatively be wound on the winding core in the two possible, opposite winding or rotational directions, a rotary angle limitation in the two possible rotational directions can take place for the first time by means of one strap element. This results in the advantages that the manufacturing and assembly complexity are lower than in the prior art, in which two strap elements are required. Moreover, less installation space is required, with the result that a compact overall design of the revolution limiter is made possible in an advantageous way.

The strap section preferably has a first surface and a second surface which is configured in the same direction with respect to said first surface, it being possible in the one winding direction for the first surface to be brought into contact with the winding core, and it being possible in the reversed winding direction for the second surface to be brought into contact with the winding core. In other words, depending on the winding direction, the first surface or the second surface of the strap section bears against the winding core.

In the neutral position which corresponds to the center position of the steering system between the two end positions of the maximum rotary angle that are provided by way of the revolution limiter (these are the stop positions), the strap element is unwound from the winding core in the case of the invention. If the steering wheel is rotated to the right or to the left out of the center position, the strap element is correspondingly wound on the winding core in a right-hand rotating or (with a reversed winding direction) left-hand rotating manner. In both cases, the revolution limit is reached when the available winding section is wound on the winding core. A stop situation is then realized, in which the strap element absorbs the steering torque which prevails between the winding core and the steering column housing. This method of operation is fundamentally not possible in the prior art, since the one specific winding direction for a strap element is predefined fixedly by way of the rotational direction of the spiral spring and cannot be reversed.

A simple and robust construction of the revolution limiter is made possible which has very smooth running during operation. Moreover, the function is less sensitive to component tolerances and dimensional tolerances.

In the stop situation, the strap element is subjected to a tensile load. The strap element is preferably more rigid in the tensile direction than in at least one bending direction.

It can preferably be provided that the strap section exerts a restoring torque of identical magnitude between the winding core and the steering column housing in both winding directions independently of the winding direction. The strap element is bent over continuously during winding up, and exerts a restoring torque on the steering shaft as a result of the reaction force which counteracts the bending over between the winding core and the steering housing. The magnitude of the restoring torque is dependent on the resiliently flexible properties of the strap element. For the primary function of the revolution limiter which limits the rotary angle, it is essential that the restoring torque is as identical as possible for the two rotational directions of the steering wheel. In order to realize this in the case of the invention, the strap section of the strap element according to the invention is preferably of symmetrical design with regard to the bending over during winding up. As a result, the bending section can be bent over transversely with respect to its longitudinal direction to the right or to the left with the same force, and winding up onto the winding core correspondingly requires substantially the same torque in the winding direction and in the opposite winding direction, which torque prevails as a restoring torque on the steering shaft. The fact that this is "of identical magnitude" according to the invention means that the magnitude of the restoring force for a rotary angle coincides within predefined tolerance limits in each case in the same winding state.

One embodiment of the invention can be realized by virtue of the fact that the winding core has an outer shell. Said outer shell is preferably configured cylindrically. Said outer shell is preferably surrounded by a hollow-cylindrical inner shell of the steering column housing at a radial spacing. The cylindrical outer shell has a winding section with an axial width which is preferably adapted to the width of the strap section. By virtue of the fact that merely one strap element is required in the axial direction according to the invention, the axial dimensions of the outer shell can be smaller than in the prior art, in the case of which two spiral-shaped strap elements are arranged next to one another in the axial direction. This results in the advantage of a more compact overall design. The outer shell of the winding core is preferably arranged coaxially in a hollow-cylindrical internal space of the steering housing which surrounds the winding core continuously, or at least in a segmented manner, over its circumference. The hollow-cylindrical internal space can be configured in a drum-shaped or tubular section of the steering housing, the inner shell of which is at a predefined radial spacing from the outer shell. It can preferably be provided that the steering housing is closed by way of a cover, preferably is closed in an air-tight and/or liquid-tight manner with use of a corresponding sealing element.

The radial spacing between the outer shell and the inner shell can preferably be dimensioned in such a way that it is greater than a permissible minimum bending radius of the strap section. Said permissible minimum bending radius indicates how much the strap element can be bent over reversibly transversely with respect to its longitudinal extent, with no plastic deformation or at least no relevant plastic deformation of the strap element occurring. This can ensure that the strap element can be bent over transversely with respect to its longitudinal extent from the one direction into the other direction in the neutral center position between the winding core and the steering column housing for the reversal according to the invention of the winding direction.

It can be provided that the external diameter of the outer shell is smaller than or equal to 0.5 times the internal diameter of the inner shell. As a result, a radial spacing between the inner shell and the outer shell can be realized which is greater than or equal to 0.5 times the external diameter of the outer shell which corresponds to the bending radius of the strap section during winding onto the winding core. As a result of this ratio between the internal diameter and external diameter, the strap element is not bent over to a more pronounced extent or is at least not substantially bent over to a more pronounced extent during the change of the winding direction than in the case of winding up. The bending loading of the material remains so low as a result that a multiplicity of reversals of the winding direction are possible without material damage, and a long service life and reliability are achieved.

It is possible that the length of the strap section between the winding core and the steering column housing is smaller than the internal circumference of the inner shell, is preferably smaller than 0.5 times the sum of the internal circumference and the external circumference. In the neutral center position, the strap section which can be wound onto the winding core is unwound from the winding core, and is situated in an exposed manner between the inner shell and the outer shell. As a result of the specified ratio, the strap section can bear tightly over its entire free length from the inside against the inner shell, and therefore a relatively low bending over which thus protects the material occurs during the reversal of the winding direction while passing through the center position.

It is advantageous that the strap section is configured as a pulling run between the winding core and the steering column housing. When the maximum permissible rotary angle is reached, the strap section is wound onto the winding core, and is clamped between the circumferential sections which can be rotated relative to one another of the winding core and the steering column housing. It is favorable here that the strap element in the pulling run is subjected substantially to a tensile load, with the result that it can reliably absorb the steering torque which is input into the steering wheel as tensile force, without additional supporting or securing measures being required. "Subjected substantially to a tensile load" means that, in the case of an equivalent stress, for example in accordance with the shape change energy hypothesis, the tensile stress represents at least 90%.

One advantageous embodiment is that at least two strap sections are provided. The strap sections can be arranged distributed over the circumference, preferably distributed homogeneously. For example, two pulling runs according to the above-described embodiment can be connected so as to lie radially opposite one another to the outer shell face of the winding core, and accordingly to the steering column housing. As a result, a redundant arrangement can advantageously be provided which provides reliable rotary angle limiting even in the case of the failure of one strap section.

One advantageous development provides that the strap section can be wound with at least two helixes above one another.

One advantageous development provides that at least two strap sections can be wound with at least two helixes above one another. Here, two pulling runs which act on the winding core in the same axial winding section can preferably be wound jointly with the same winding direction depending on the rotational direction. Here, the two strap sections are wound above one another in the radial direction, with the result that the two strap sections are arranged in the form of a double-helix spiral. It is advantageous here that two (or more) strap sections can be received on the winding core without an increase in the axial installation space. As a result, a compact, redundant arrangement can be realized.

The winding core and/or the steering column housing can have at least one transverse slot, through which the strap element is guided. A transverse slot forms a slot which can pass through the winding core, for example, transversely with respect to the longitudinal axis. Accordingly, a steering column housing which surrounds the winding core in a drum-shaped manner can have one transverse slot per strap section, which transverse slot passes transversely through from the inner shell radially to the outside. A strap element can simply be hooked into the transverse slot or slots, with the result that it is fastened reliably to the winding core and/or to the steering column housing with regard to the forces in both winding directions which occur during winding up and act in the circumferential direction. One advantageous development is that the transverse slot or slots is/are open on the end side, that is to say axially, with the result that a flat strap element can be inserted into the transverse slot and fixed in its width axially in the direction of the longitudinal axis.

It can be advantageous that the strap element is configured as a closed loop. A closed loop has an annular endless strap which, on account of its closed shape, can be fastened to the winding core and to the steering column housing with low complexity without additional fastening elements by way of being hooked in. For hooking in, for example, hook-shaped tabs or abutments can be arranged on the winding core and on the steering column housing. A reliable arrangement, which can be realized with low complexity, for fastening the closed loop can be provided by virtue of the fact that the strap element is guided through a transverse slot which passes transversely through the winding core. The strap element exits from the transverse slot via two pulling runs which emanate diametrically from the winding core radially to the outside, extend as strap sections as far as the inner side of the steering column housing, and are guided there through two transverse slots which pass through to the outside and are likewise arranged diametrically with respect to one another with regard to the longitudinal axis. Between said two transverse slots, the strap element is guided on the outside around the steering column housing. The strap element is fixed in the transverse slots in the circumferential direction relative to the outer shell of the core element, and also relative to the steering column housing. If the transverse slots are of axially open configuration, the closed loop of the strap element can be inserted axially into the transverse slots in a simple manner for assembly. In this way, a particularly reliable connection can be produced without further fastening means. One advantage for the reversal according to the invention of the winding direction here is that the strap sections lead out of the transverse slots in the radial direction, with the result that they can be bent over in both circumferential directions.

The strap element can preferably be configured from a fiber fabric, for example a cord. A fiber fabric can be capable of withstanding high tensile loads by way of the use of high-strength fibers, for example metal, aramid or carbon fibers or the like, and can be of particularly flexible configuration here. The high flexibility means that, unlike, for example, in the case of a spiral spring, only relatively low restoring forces occur in the case of the bending deformation during winding up. This property is also called flexurally slack or dimensionally unstable. As a result, the torque which is required for winding up and for reversing the winding direction is correspondingly low, and elastic restoring forces which are dependent on the rotary angle and are not relevant and undesired for the function of the revolution limiter do not occur or are negligibly small. As a result of the use of fibers with high tensile strength, a high tensile strength of the strap element can be realized in the case of small dimensions. The strap element can comprise, for example, a flat, belt-shaped, woven strap.

The strap element can comprise a plastic and/or a rubber material and/or a glass material and/or a metal material, or combinations thereof. Fiber composite materials can preferably be used.

The steering column housing can be part of a casing unit or can form a casing unit of this type which is connected to a supporting unit which can be mounted on the vehicle. The steering column housing can be stationary, or can be adjusted manually or by motor relative to the supporting unit. Furthermore, the steering shaft can be arranged fixedly or can be adjustable relative to the steering column housing or to the supporting unit in the direction of the longitudinal axis. In this way, a steering column which is stationary or can be adjusted in the vertical and/or longitudinal direction can be formed, with it being possible for the adjustment to take place manually or by means of motorized adjusting drives.

Figure 2:
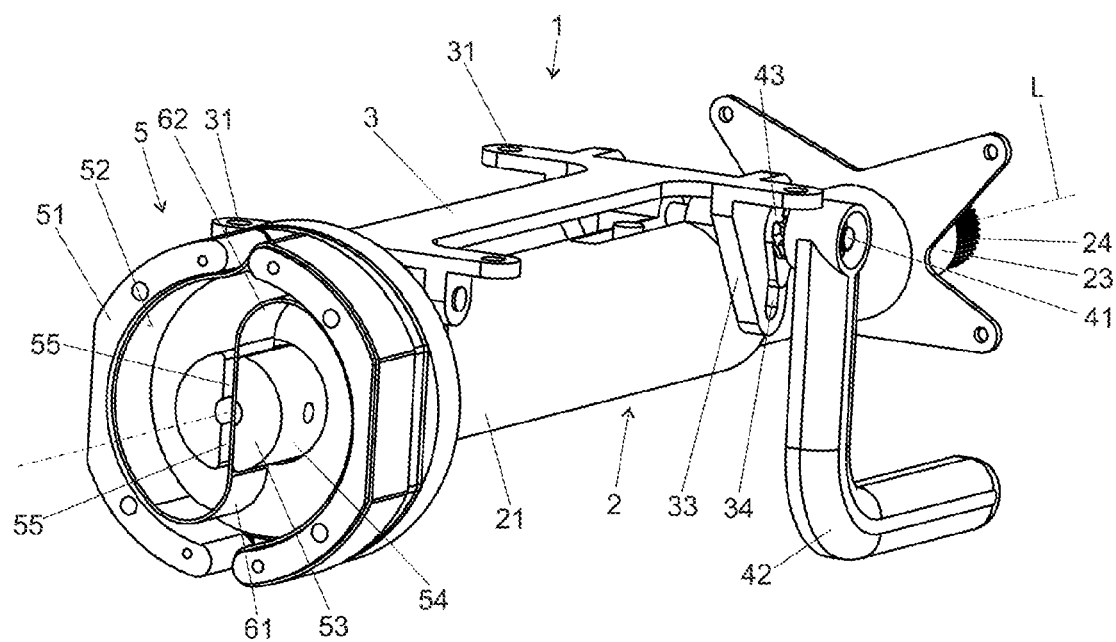
FIG. 2 is a further perspective view of the steering column according to FIG. 1.

FIGS. 1 and 2 show different perspective views of a steering column 1 of a steer-by-wire steering system, from the back left in FIG. 1, and from the front left in FIG. 2, in each case in relation to the driving direction.

The steering column 1 comprises an actuating unit 2 which has a steering column housing 21 which is also called a casing unit or an outer casing tube. A casing tube 22 is received in the steering column housing 21, in which casing tube 22 a steering shaft 23 is mounted such that it can be rotated about the longitudinal axis L. At the rear (with regard to the driving direction) end which faces the driver, the steering shaft 23 has a connector section 24 for attaching a steering wheel (not shown here). For the longitudinal adjustment of the steering wheel, the casing tube 22 can be adjusted telescopically in the direction of the longitudinal axis L relative to the steering column housing 21, as is indicated by way of the double arrow parallel to the longitudinal axis L.

The actuating unit 2 is held by a supporting unit 3 which has fastening openings 31 for attaching to a body (not shown) of a motor vehicle. In a front region, the steering column housing 21 is mounted on the supporting unit 3 such that it can be pivoted about a horizontal pivot axis 32 which lies transversely with respect to the longitudinal axis L, as a result of which a height adjustment of the rear, driver-side end of the steering shaft 23 in the vertical direction H is made possible.

The supporting unit 3 has two side cheeks 33 at a spacing toward the rear from the pivot axis 32, which side cheeks 33 extend downward parallel to one another and between which the steering column housing 21 is received.

A clamping device 4 comprises a clamping bolt 41 which is guided through the two side cheeks 33 through slots 34 which run in the vertical direction H. A clamping lever 42 is fastened to the clamping bolt 41, by way of which clamping lever 40 the clamping bolt 41 can be rotated manually about its axis.

The clamping device 4 has a clamping mechanism 43 which converts a rotation of the clamping bolt 41 about its axis into a clamping stroke in the direction of its axis, for example by means of a V-pulley, cam or tilt pin mechanism which is known per se. The clamping pin 41 is supported from the outside against the two side cheeks 33 via the clamping mechanism 43. If the clamping lever 42 is rotated into the clamping or fixing position by way of manual actuation of the clamping lever 41 in the one direction, the two side cheeks 33 are pressed against one another and, as a result, the steering column housing is clamped in between the side cheeks 33 and is thereby fixed in the vertical direction H relative to the supporting unit 3. Here, the casing tube 22 is also braced in the steering column housing 21, with the result that fixing in the direction of the longitudinal axis L likewise takes place.

If the clamping lever 42 is moved into the release position by way of a reversed rotation, the clamping stroke is canceled, and the clamping of the steering column housing 21 between the side cheeks 33 is released. The clamping bolt 41 can then be moved up or down together with the steering column housing 21 in the vertical direction H in the slots 34 for height adjustment, and the casing tube 22 can be pushed in toward the front telescopically into the steering column housing 21 or can be pulled out toward the rear in the direction of the longitudinal axis L for longitudinal adjustment.

Figure 3:
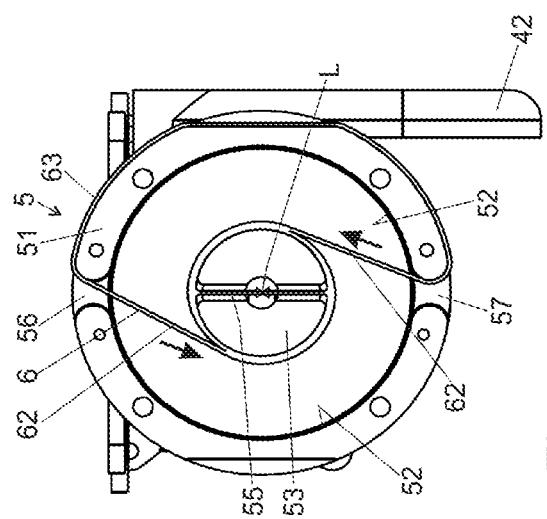
FIG. 3 is a diagrammatic axial view of a revolution limiter of the steering column according to FIGS. 1 and 2 in a first rotary angle position (i.e., a neutral center position).
Figure 4:
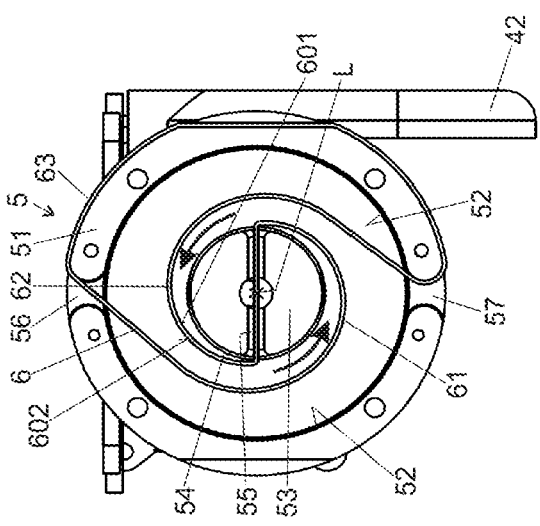
FIG. 4 is a diagrammatic axial view of a revolution limiter as in FIG. 3, in a second rotary angle position (i.e., an intermediate position).
Figure 5:
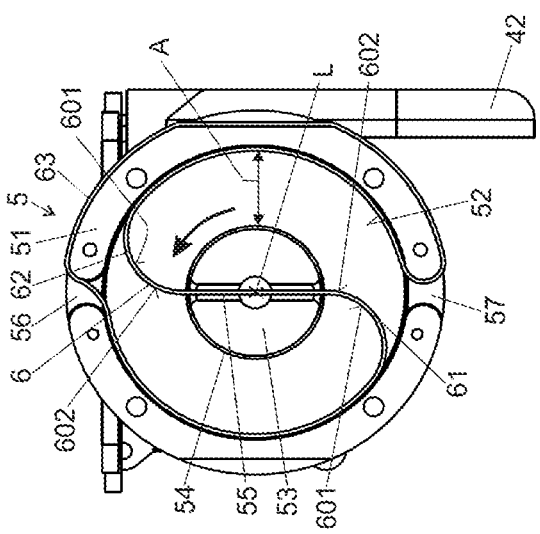
FIG. 5 is a diagrammatic axial view of the revolution limiter as in FIG. 3, in a third rotary angle position (i.e., a stop position with regard to rotation to the right=in the clockwise direction).

A revolution limiter 5 which is configured according to the invention is attached at the front to the steering column 1. Said revolution limiter 5 is shown open at the front in a perspective view in FIG. 2, in order to provide an unimpeded view into the interior. FIGS. 3, 4 and 5 show an axial view from the front (in the direction of the longitudinal axis L) in different rotary angle positions of the steering shaft 23. The revolution limiter 5 can be closed by way of a cover (not shown).

The revolution limiter 5 has a housing which is configured as a drum 51 and forms a part of the steering column housing 21, with which it is configured in one piece or to which it is connected fixedly. The drum 51 is of hollow-cylindrical configuration, with an inner shell 52 which is arranged coaxially with respect to the longitudinal axis L.

A winding core 53 which is connected fixedly to the steering shaft 23 is arranged in the drum 51, which winding core 53 has a cylindrical outer shell 54 which is coaxial with respect to the longitudinal axis L.

The external diameter of the outer shell 54 is preferably smaller than or equal to 0.5 times the internal diameter of the inner shell 52. The inner shell 52 is at a radial spacing A (see FIG. 3) from the outer shell 54, which radial spacing A is preferably greater than or equal to 0.5 times the diameter of the winding core 53, that is to say the external diameter of the outer shell 54.

The winding core 53 has a transverse slot 55 which passes through diametrically, transversely with respect to the longitudinal axis L, and is axially open toward the front. The transverse slot 55 opens in a diametrically opposite manner in the outer shell 54.

The drum 51 has two transverse slots 56, 57 which lie diametrically opposite one another with regard to the longitudinal axis L, form passages from the inner shell 52 to the outer side of the drum 51, and are likewise axially open on the end side.

A strap element 6 which is configured as a closed loop is attached between the winding core 53 and the drum 51, as can be seen clearly in FIG. 3. The strap element 6 is a highly flexible, flat strap with a width which is adapted to the axial width of the outer shell 54, which axial width also corresponds approximately to the axial width of the inner shell 52. The strap element 6 can comprise a high strength fiber fabric or cord composite, and is highly flexible, with the result that only a negligibly low elastic restoring force occurs in the case of bending over transversely with respect to its longitudinal extent and its width.

The strap element 6 is guided through the transverse slot 55 of the winding core 53 transversely with respect to the longitudinal axis L, the transverse slot 55 being provided with an insertion bevel, in order to effectively prevent damage of the strap element 6. As a result, a fixed connection of the strap element 6 to the winding core 53 for conjoint rotation is realized. The strap section 61 which exits radially out of the winding core 53 on the one side extends through the one transverse slot 56 to the outer side of the drum 51, and the strap section 62 which exits radially out of the winding core 53 on the other side extends through the other transverse slot 57 to the outer side of the drum 51. The strap sections 61 and 62 are connected to one another as a closed loop by way of a strap section 63 which is guided around the drum 51 on the outside. As a result, the strap element 6 is fixed in the circumferential direction with regard to the inner shell 52.

The function of the revolution limiter 3 will be explained on the basis of the phase illustrations in FIGS. 3, 4 and 5 which in each case show different rotary angle positions of the steering shaft 23 and of the winding core 53 which is connected to it.

FIG. 3 shows the neutral center position. The two strap sections 61, 62 lead radially out of the transverse slot 55 and extend arcuately in a manner which is free from tensile stress as far as the inner shell 52, against which they bear tightly as far as the transverse slots 56, 57, where they are guided out to the outside.

Figure 7:
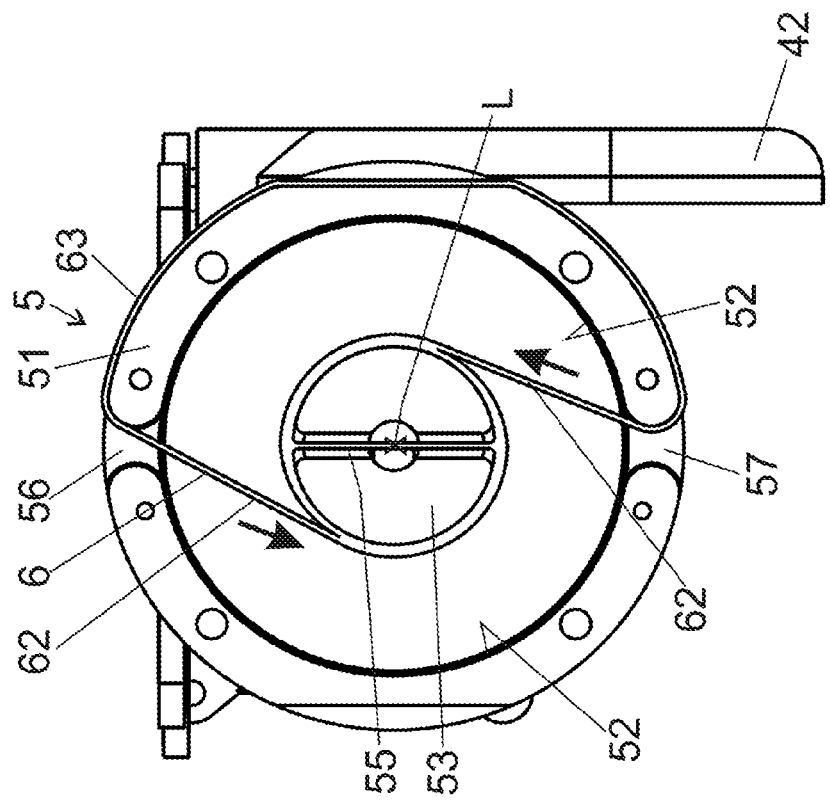
FIG. 7 is a diagrammatic axial view of the revolution limiter as in FIG. 3, in a fifth rotary angle position (i.e., a stop position with regard to rotation to the left=in the counterclockwise direction).
Figure 6:
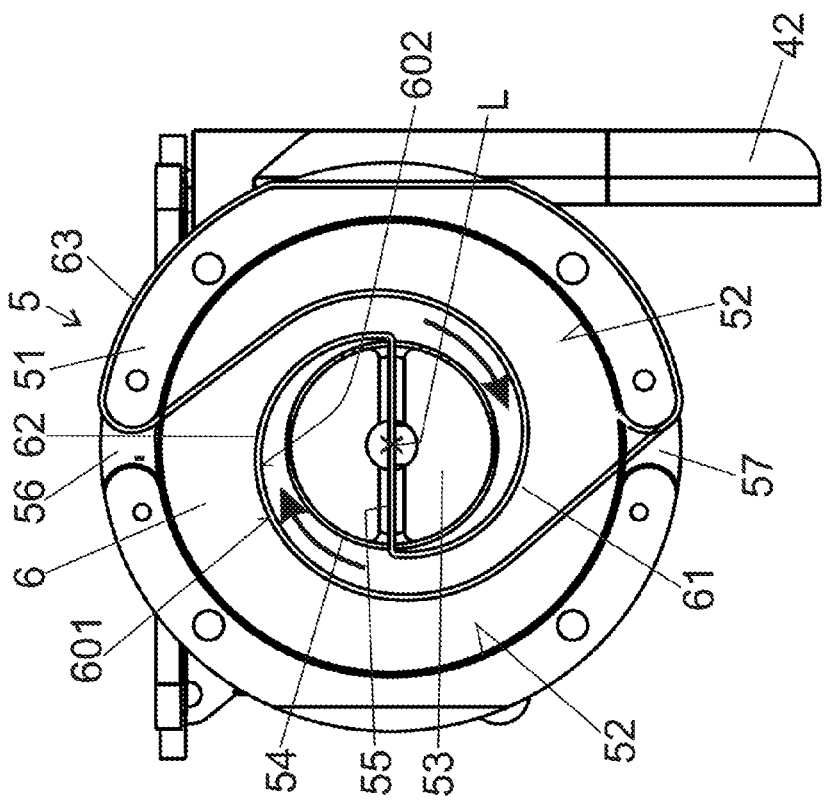
FIG. 6 is a diagrammatic axial view of the revolution limiter as in FIG. 3, in a fourth rotary angle position (i.e., an intermediate position) in the other winding direction in comparison with that in FIG. 4.

In the case of a rotation of the steering shaft 23 in the clockwise direction, the winding core 53 rotates counter to the clockwise direction in the view of FIGS. 2, 3, 4 and 5, as indicated by way of the arrow, and rotates in the clockwise direction in FIGS. 6 and 7.

FIG. 4 shows an intermediate position, in which it can be seen clearly how the strap sections are wound in the form of a double-helix spiral on the outer shell 54 on the winding core 53.

The two strap sections 61, 62 are wound further by way of further rotation until the remaining free regions of the strap sections 61, 62 are tensioned tautly as pulling runs between the winding core 53 and the slots 56, 57 of the drum 51, as can be seen in FIG. 5. This represents the one-stop position, that is to say the end position of the maximum rotary angle. A steering torque which is then input via the steering wheel into the steering shaft 23 acts as a tensile stress on the strap sections 61, 62 and, as a result, a further rotation is prevented.

Each strap section 61, 62 has a first surface 601 and a second surface 602 which is configured in the same direction with respect to said first surface 601, it being possible for the first surface 601 to be brought into contact with the winding core 53 in the one winding direction, and it being possible for the second surface 602 to be brought into contact with the winding core in the opposite winding direction. In other words, depending on the winding direction, the first surface 601 or the second surface 602 of the strap section 61, 62 bears against the winding core 53.

Starting from the neutral position of FIG. 3, the steering shaft 23 can also be rotated in the opposite rotational direction. The strip sections 61, 62 are then wound onto the winding core 53 in a winding direction which is opposite to the winding direction of FIGS. 4 and 5. Here, mirror-inverted arrangements with respect to FIGS. 4 and 5 occur. They are shown in FIGS. 6 and 7, FIG. 7 showing the opposite end stop with respect to FIG. 5.

FIG. 6 shows an intermediate position, in which it can be seen clearly how the strap sections 61, 62 are wound onto the winding core 53 in the form of a double-helix spiral on the outer shell 53, FIG. 6 showing the reverse winding direction with respect to FIG. 4.

It can be seen from the figures that a simpler, more compact construction can be realized owing to the invention.

LIST OF DESIGNATIONS

1 Steering column
2 Actuating unit
21 Steering column housing
22 Casing tube
23 Steering shaft
24 Connector section
3 Supporting unit
31 Fastening openings
32 Pivot axis
33 Side cheeks
34 Slot
4 Clamping device
41 Clamping bolt
42 Clamping lever
43 Clamping mechanism
5 Revolution limiter
51 Drum
52 Inner shell
53 Winding core
54 Outer shell
55 Transverse slot
56, 57 Transverse slots
6 Strap element
61, 62 Strap sections
63 Strap section
L Longitudinal axis
H Vertical direction

What is claimed is:

1. A steering column for a motor vehicle, the steering column comprising:
  a steering shaft mounted so as to be rotatable about a longitudinal axis relative to a steering column housing;
  a revolution limiter for limiting rotation of the steering shaft, wherein the revolution limiter has a winding core that is connected fixedly to the steering shaft for conjoint rotation; and
  a strap element attached to the winding core and to the steering column housing, wherein the strap element is elongate, is deformable flexibly transversely with respect to a longitudinal extent of the strap element, and has a strap section that is configured to be wound on the winding core in a winding direction around the longitudinal axis,
  wherein the strap element is configured as a single closed loop annular endless strap,
  wherein the winding direction of the strap section is reversible, wherein the strap section comprises two strap sections that are configured to be wound on top of one another in at least two directions.

2. The steering column of claim 1 wherein the strap section exerts a restoring torque of identical magnitude between the winding core and the steering column housing in both winding directions independently of the winding direction.

3. The steering column of claim 1 wherein the winding core has an outer shell.

4. The steering column of claim 3 wherein the outer shell is surrounded by a hollow-cylindrical inner shell of the steering column housing at a radial spacing.

5. The steering column of claim 1 wherein the strap section is configured as a pulling run between the winding core and the steering column housing.

6. The steering column of claim 1 wherein the strap section is configured to be wound with at least two helixes above one another.

7. The steering column of claim 1 wherein the strap section is a first strap section, the steering column comprising a second strap section.

8. The steering column of claim 1 wherein at least one of the winding core or the steering column housing has a transverse slot through which the strap element is guided.

9. The steering column of claim 1 wherein the strap element is comprised of fiber fabric.

10. The steering column of claim 1 wherein the strap element comprises at least one of plastic, rubber, glass, or metal.

11. A steering column for a motor vehicle, the steering column comprising:
- a steering shaft mounted so as to be rotatable about a longitudinal axis relative to a steering column housing;
- a revolution limiter for limiting rotation of the steering shaft, wherein the revolution limiter has a winding core that is connected fixedly to the steering shaft for conjoint rotation; and
- a strap element attached to the winding core and to the steering column housing, wherein the strap element is elongate, is deformable flexibly transversely with respect to a longitudinal extent of the strap element, and has a strap section that is configured to be wound on the winding core in a winding direction around the longitudinal axis,
- wherein the strap element is configured as a single closed loop annular endless strap,
- wherein the winding direction of the strap section is reversible and wherein one of the winding core and the steering column housing defines a transverse slot through which the strap element is guided.

12. The steering column of claim 11 wherein the strap section exerts a restoring torque of identical magnitude between the winding core and the steering column housing in both winding directions independently of the winding direction.

13. The steering column of claim 11 wherein the winding core has an outer shell.

14. The steering column of claim 13 wherein the outer shell is surrounded by a hollow-cylindrical inner shell of the steering column housing at a radial spacing.

15. The steering column of claim 11 wherein the strap section is configured as a pulling run between the winding core and the steering column housing.

16. A steering column for a motor vehicle, the steering column comprising:
- a steering shaft mounted so as to be rotatable about a longitudinal axis relative to a steering column housing;
- a revolution limiter for limiting rotation of the steering shaft, wherein the revolution limiter has a winding core that is connected fixedly to the steering shaft for conjoint rotation; and
- a strap element attached to the winding core and to the steering column housing, wherein the strap element is elongate, is deformable flexibly transversely with respect to a longitudinal extent of the strap element, and has a strap section that is configured to be wound on the winding core in a winding direction around the longitudinal axis,
- wherein the winding direction of the strap section is reversible and wherein the strap element is configured as a single closed loop annular endless strap.

17. The steering column of claim 16 wherein the strap section is configured as a pulling run between the winding core and the steering column housing.

18. The steering column of claim 16 wherein the strap section is configured to be wound with at least two helixes above one another.

19. The steering column of claim 16 wherein the strap section is a first strap section, the steering column comprising a second strap section.

* * * * *